United States Patent Office 3,175,322
Patented Mar. 30, 1965

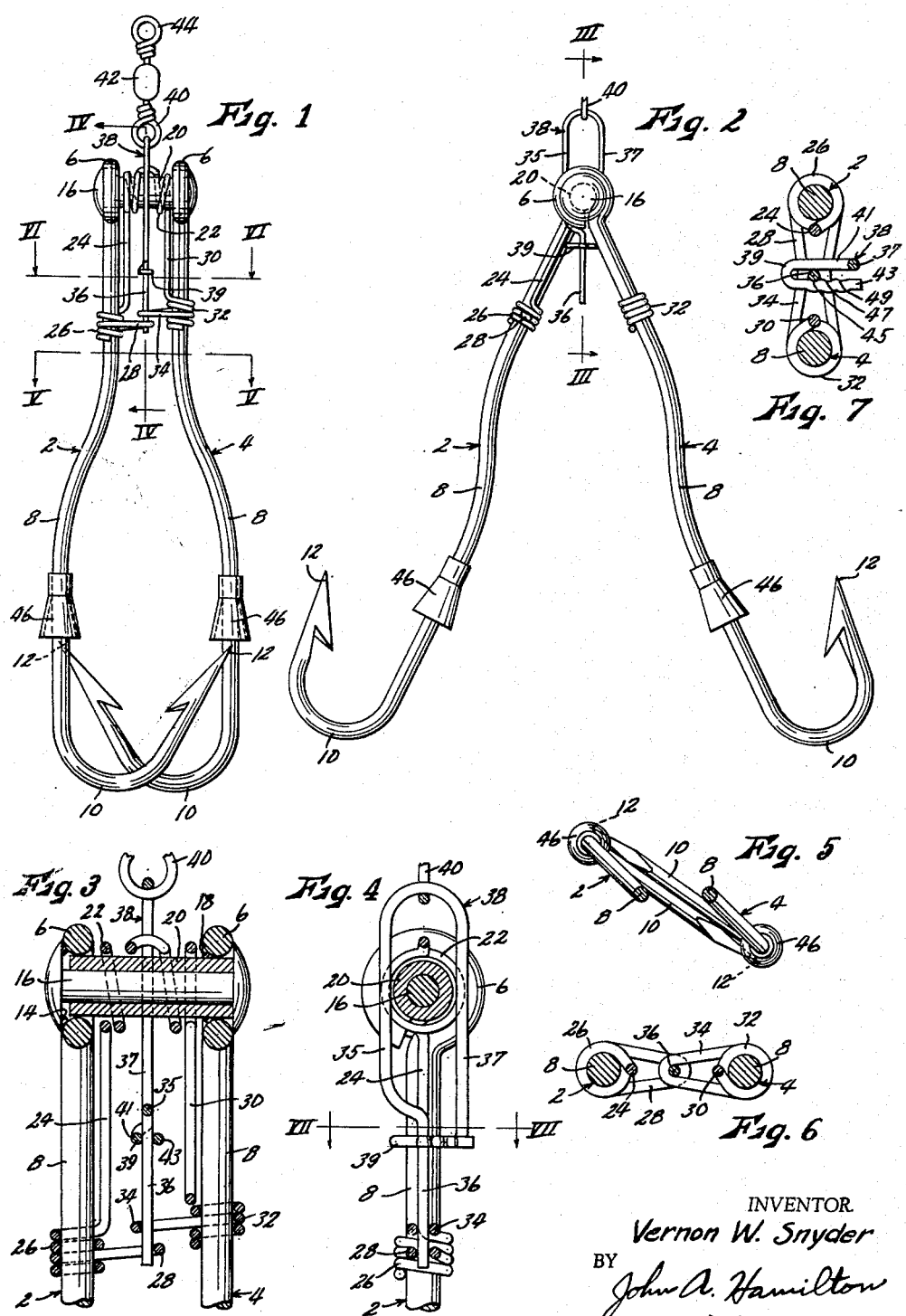

3,175,322
FISHHOOK
Vernon W. Snyder, 512 Virginia St., Sabetha, Kans.
Filed Mar. 28, 1963, Ser. No. 268,712
1 Claim. (Cl. 43—36)

This invention relates to new and useful improvements in fishhooks, and has particular reference to that class of fishhooks commonly known as "spring-actuated" fishhooks.

The prime object of the present invention is the provision of a fishhook comprising a pair of fishhooks pivotally joined at their eyes and normally secured by a latch in a position with their bight and point portions in close juxtaposition so that they may easily enter the fish's mouth when said fish bites at the bait, but spring biased to move to widely separated positions whenever the latch is released by the pull exerted on the bait by the fish, whereby the points of said hooks are set firmly in the fish's mouth.

Another object is the provision of a fishhook of the character described wherein the action of setting the hook in fish's mouth is assisted by the fact that the point of each hook extends from the shank thereof in the direction in which said shank is moved by the spring biasing means.

A further object is the provision of a fishhook of the character described in which are provided means for shrouding or shielding the points when the hook is in its normal cocked position. This not only virtually eliminates any possibility that the fish might feel the sharp points and thereby be warned away, but also provides a weed guard preventing the snagging and fouling of the hook by underwater weeds, logs, or other obstructions.

Still another object is the provision, in a fishhook of the character described, of means for adjusting the sensitivity of the latch, that is, means for adjusting the magnitude of the pull which must be exerted on the bait by the fish to release the latch.

Other objects are simplicity and economy of construction, and efficiency and dependability of operation.

With these objects in view, as well as other objects which will appear in the course of the specification, reference will be had to the accompanying drawing, wherein:

FIG. 1 is an enlarged front elevational view of a fishhook embodying the present invention, showing said hook in its normal cocked position.

FIG. 2 is a side elevational view of the fishhook shown in FIG. 1, with the latch released and the points expanded, FIG. 3 is an enlarged fragmentary sectional view taken on line III—III of FIG. 2, with the hook in its cocked position, FIG. 4 is an enlarged fragmentary sectional view taken on line IV—IV of FIG. 1, FIG. 5 is a sectional view taken on line V—V of FIG. 1, FIG. 6 is an enlarged sectional view taken on line VI—VI of FIG. 1, and FIG. 7 is a sectional view taken on line VII—VII of FIG. 4.

Like reference numerals apply to similar parts throughout the several views, and the numerals 2 and 4 apply generally and respectively to a pair of fishhooks which conjointly form the composite fishhook forming the subject matter of the present invention. Each of said fishhooks is formed of wire, having an eye 6, an elongated shank 8, a rebent curved bight portion 10 at the end of the shank opposite from eye 6, and a barbed point 12 at the free end of the bight. The eyes 6 of the two hooks are disposed in coaxial, spaced apart relationship, the eye of hook 2 being welded as at 14 (see FIG. 3) to a rivet 16 extending coaxially therethrough, and the eye of hook 4 being welded at 18 to a tubular sleeve 20 in which rivet 16 is rotatably secured. A helical compression spring 22 is coiled loosely about sleeve 20 between eyes 6. One terminal leg 24 of said spring extends along the shank of hook 2 to a point spaced apart from sleeve 20, and is secured to said shank by being wrapped tightly thereabout as indicated at 26, one turn of said wrapping being offset toward the shank of hook 4 to form a keeper loop 28. The other terminal leg 30 of spring 22 extends along the shank of hook 4 to a point spaced apart from sleeve 20, and is secured to said shank by being wrapped tightly thereabout as indicated at 32, one turn of said wrapping being offset toward the shank of hook 2 to form a keeper loop 34. When the shanks of the two hooks are generally parallel and extend in the same angular direction from sleeve 20, the two keeper loops 28 and 34 are disposed in aligned relationship as best shown in FIG. 6, whereby to receive therethrough a straight latch pin 36 which is then parallel to the two shanks. Said latch pin is formed of resilient wire, and is an extension of one leg 35 (see FIG. 4) of an elongated retainer loop designated generally by the numeral 38 and engaged loosely about sleeve 20, the elongation of said loop permitting it to be moved longitudinally of itself relative to said sleeve, so that latch pin 36 may be moved into or out of engagement with latch loops 28 and 34, as will be described. The opposite leg 37 of loop 38 is formed to present a U-shaped clip 39 disposed in a plane at right angles to latch pin 36 and engaging said latch pin clampingly between the legs 41 and 43 thereof. As best shown in FIG. 7, at least one of said legs (leg 43 as shown) is formed with undulated shape to present a series of notches 45, 47, and 49, in which latch pin 36 may be engaged selectively. When said latch pin is engaged in notch 45, as illustrated, the two legs 35 and 37 of loop 38 are substantially parallel, and are spaced apart by a distance greater than the diameter of sleeve 20, so that the latch pin is retained in keeper loops 28 and 34 only by friction therebetween. This represents the most sensitive setting of the hook, in that the latch may be released by a very slight pull on loop 38. If latch pin 36 is set in notch 47, legs 35 and 37 of loop 38 converge toward the latch pin, so that in pulling loop 38 to release the latch, the pulling force must be sufficiently great not only to overcome the friction of the latch pin in loops 28 and 34, but also to cause sleeve 20 to spread legs 35 and 37 resiliently apart. Setting the latch pin in notch 49 increases the angularity between legs 35 and 37, and requires a correspondingly greater pull on loop 38 to release the latch.

Engaged in loop 38, at the end thereof remote from the latch pin, is one eye 40 of an ordinary swivel connector 42, the opposite eye 44 of said connector being adapted to have the usual fishing line or leader, not shown, affixed therein. Affixed to the shank of each hook, adjacent the bight 10 thereof, is a conically shaped guard 46. Each guard, which may be formed of sheet metal and welded or otherwise permanently attached to the hook shank, is coaxial with the shank to which it is attached, with its larger end facing toward the bight 10.

The "cocked" position of the fishhook occurs when latch pin 36 is engaged in keeper loops 28 and 34 as previously described. In this position, which is illustrated in all of the figures of the drawing except FIG. 2, the bights 10 of the hooks lie in abutting planes disposed angularly to a plane including the pivotal axis of the hooks and bisecting said bights, with the point 12 of each hook disposed closely adjacent the shank 8 of the other hook and directly adjacent the guard 46 of said other hook. That is, the point of each hook is then spaced apart from the shank of the other hook by a distance less than the radius of the guard 46 of said other hook, so that the point is shrouded by said guard. This is the "fishing" position of the hook, it being understood of course that either natural or artificial bait of any type desired may be attached to either or both of the hooks.

As the hook is pulled through the water in a direction toward the eye end thereof, by a fishing line secured in eye 44, guards 46 always move ahead of the hook points 12 to prevent said points from becoming snagged or fouled in weeds or other underwater obstructions. Furthermore, said guards preclude any possibility that a fish in striking at the bait would encounter the sharp points with its mouth and be warned away thereby before the latch is tripped and the hooks set in the fish's mouth. When a fish does bite at the bait and pull thereon, the hooks are pulled in a direction away from the free end of latch pin 36, said latch pin, together with loop 38 and swivel connector 42, being restrained against movement in the same direction by their direct attachment to the fishing line. The keeper loops 28 and 34 are thus pulled off of the free end of the latch pin, whereupon torsion spring 22 pivots the two hooks relatively to the position shown in FIG. 2, wherein the bight and point portions are widely separated. The magnitude of the pull required to affect this release may be varied by setting the latch pin selectively in notch 45, 47 or 49, as previously described. The separation of the points of course greatly assists in setting the hooks in the fish's mouth, and greatly reduces the chance that a fish will escape after "nibbling" at the bait. The positive action of the hook is further enhanced by the fact that the normal planes of bights 10 are disposed angularly to a plane including the pivotal axis of sleeve 20 and bisecting said bights, as previously described, and that the point of each hook is disposed at the side of said last named plane toward which said hook is moved by spring 22 when the latch is released. This provides that as the hooks are spread apart by the spring, the point of each hook advances ahead of its shank as shown in FIG. 2, so that said point is fully exposed and free for easy engagement in the fish's mouth. This is considered to be an improvement over the operation which would occur if the bight of each hook were disposed in a plane including the axis of sleeve 20. In the latter case, the shank of the hook would advance evenly with the point thereof, and might deflect the hook out of the fish's mouth before the point thereof could be properly engaged and set.

While I have shown and described a specific embodiment of my invention, it will be readily apparent that many minor changes of structure and operation could be made without departing from the spirit of the invention as defined by the scope of the appended claim.

What I claim as new and desire to protect by Letters Patent is:

A composite fishhook comprising:
(a) a pair of fishhooks each having an eye, an elongated shank, a rebent bight portion at the end of said shank opposite from said eye, and a point at the free end of said bight,
(b) a pivot pin extending between said eyes at right angles to the general extent of said shanks and joining said hooks for relative pivotal movement about the axis of said pivot pin from a cocked position in which the bight and point portions thereof are in close juxtaposition to a released position in which said bight and point portions are widely separated,
(c) means biasing said hooks toward said released position, and
(d) latch means releasably securing said hooks in said cocked position, said latch means comprising:
(1) an elongated retainer loop of resilient wire encircling said pivot pin and disposed in a plane generally at right angles to said pivot pin, whereby said loop may be moved longitudinally of itself with respect to said pivot pin, said loop having two side legs generally parallel to the major axis thereof, the spacing of said legs at one end of said loop being fixed and at least as great as the diameter of said pivot pin,
(2) means adjustably connecting said side legs at the opposite end of said loop whereby said side legs may be disposed either parallel with each other or in converging relation toward the adjustable end of the loop to a spacing less than the diameter of said pivot pin,
(3) a generally straight latch pin affixed to said retainer loop at the adjustable end thereof and extending therefrom generally parallel to the major axis thereof, and
(4) a keeper loop affixed to the shank of each hook in spaced relation from said pivot pin, said keeper loops being aligned radially of said pivot when said hooks are in the cocked position, whereby to receive the free end portion of said latch pin therethrough to secure said hooks releasably in the cocked position, said retainer loop then being disposed with its non-adjustable end adjacent said pivot pin, the end of said retainer loop opposite said latch pin having a fishing line secured therein, whereby tension on said fishing line will urge the adjustable end of said retainer loop toward said pivot pin to withdraw said latch pin from said keeper loops, this motion of said retainer loop necessitating spreading of the resilient side legs thereof by said pivot pin if said side legs have been adjusted to converge toward the adjustable end of said retainer loop.

References Cited by the Examiner

UNITED STATES PATENTS

| 1,262,039 | 4/18 | Graves | 43—35 |
| 1,957,799 | 5/34 | Peterson | 43—36 |
| 2,079,509 | 5/37 | Kettring | 43—35 |
| 2,810,230 | 10/57 | Dawson | 43—37 |
| 3,020,667 | 2/62 | Lamar | 43—35 |

FOREIGN PATENTS

| 631,130 | 11/61 | Canada. |
| 1,200,450 | 6/59 | France. |

ABRAHAM G. STONE, *Primary Examiner.*